July 20, 1965 G. D. CHENEY 3,196,422
MAGNETIC DATA STORAGE DISC SYSTEM
Filed Oct. 18, 1962
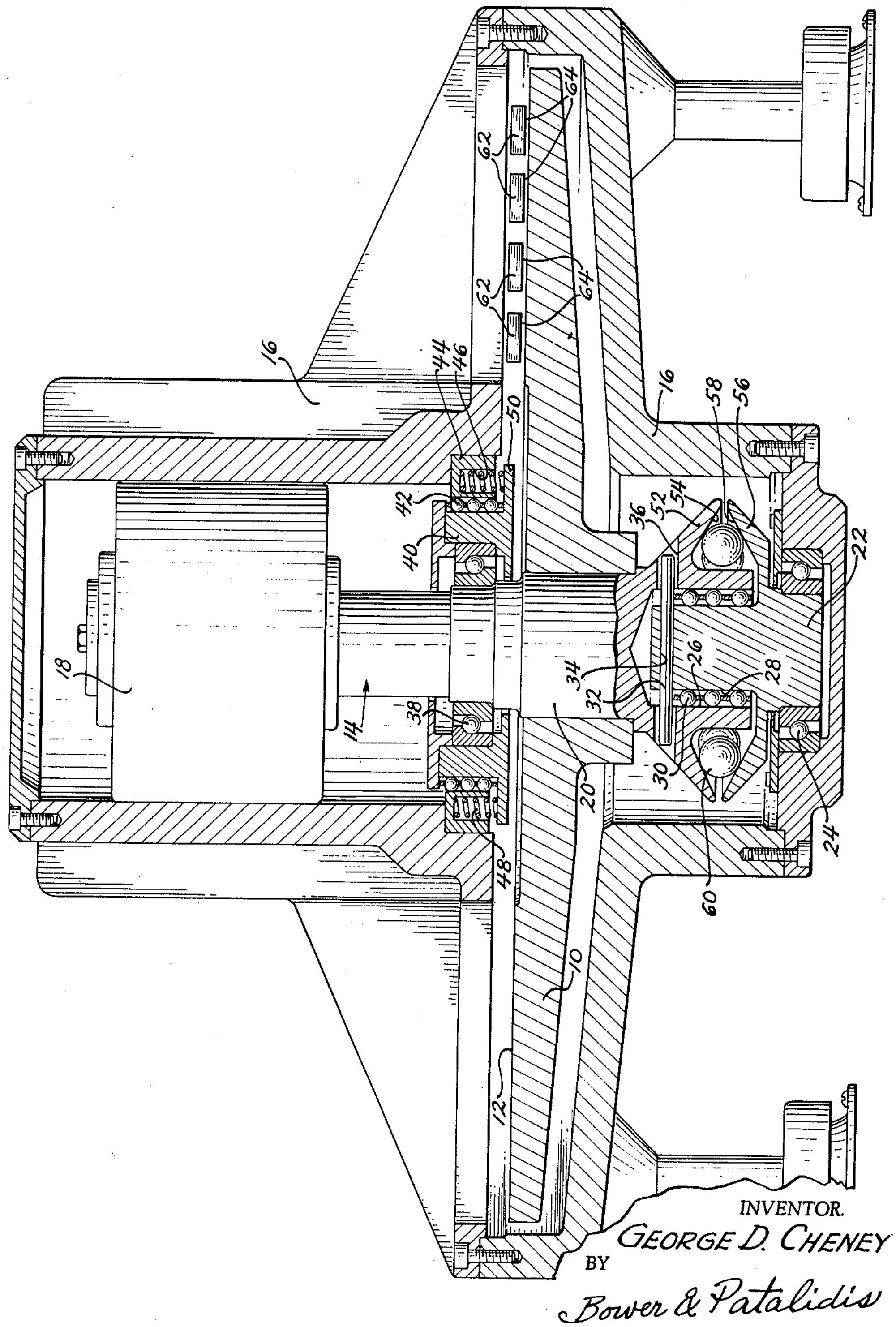
INVENTOR.
GEORGE D. CHENEY
BY
Bower & Patalidis
ATTORNEYS 3,196,422

MAGNETIC DATA STORAGE DISC SYSTEM

George D. Cheney, Orchard Lake, Mich., assignor to Ex-Cell-O Corporation, Detroit, Mich.

Filed Oct. 18, 1962, Ser. No. 231,356
9 Claims. (Cl. 340—174.1)

This invention relates to magnetic data storage disc systems in general, and more particularly to mechanisms arranged to linearly and axially displace a rotatable disc from a position of rest in static condition affording a substantial clearance or air gap between the magnetizable surface on the disc and the pole pieces of associated transducer heads, to an operative position in dynamic condition affording a minimal air gap for improved recording and playback signals.

This application is a continuation in part of United States patent application Serial Number 199,422 filed on June 1, 1962 by the same inventor and assigned to the same assignee as the present invention.

In magnetic recording on discs, drums and the like, it is a preferred practice to prevent actual physical contact between the transducer heads and the magnetizable surface in order to avoid wear and prevent damage to the components. It is also desirable to position the flux emitting ends of the magnetic transducers in such a way as to establish a very narrow clearance or air gap between the flux emitting ends and the record surface in order to obtain high quality recording and playback, together with high packing or "bit" density per inch of tracks.

United States patent application Serial Number 199,422 teaches several mechanisms arranged to linearly and axially displace a rotatable frusto-conical drum to a position which causes the clearance between the transducer head pole pieces and the record surface to be reduced during operation. Such mechanisms may obviously be adapted to linearly and axially displace and position a disc member, and the present invention contemplates utilizing the principles of the aforementioned invention in an example of structural embodiment particularly adapted to provide a disc-shaped record support which is automatically axially displaced, thereby longitudinally moving the record surface thereon in such a manner as to decrease the clearance or air gap between the record surface and the transducer heads during dynamic condition. The disc of the invention may be used with stationary transducer heads, or better yet, it may be used in combination with resiliently supported transducer heads such as those which are adapted to ride on a laminar film of fluid clinging to the record surface and set in motion by the rotation thereof, sometimes called "flying" heads. When employed with "flying" heads, the present invention presents the advantage of a simplified construction of the magnetic data storage device requiring no auxiliary means for bringing the transducer heads in close proximity to the record surface after the latter has reached its operational velocity, or the necessity of starting the apparatus with the transducer heads in contact and rubbing against the record surface until a laminar film of fluid has been developed which is strong enough to support the transducer heads against their own weight and against the force of the resilient means normally urging the heads toward the record surface. By use of the teachings of the present invention, a magnetic data storage disc can be started with the transducer heads out of contact from the record surface and accelerated to a velocity sufficient to develop a laminar film of fluid. At this time, the disc of the invention is automatically axially displaced, thereby bringing the record surface in close proximity to the magnetic heads which are then supported by a fluid bearing at the appropriate distance away from the record surface. The invention also provides an automatic "fail safe" mechanism which axially displaces the disc in an opposite direction, as soon as the angular velocity falls below a predetermined value, thereby preventing accidental damaging contact between the transducer heads and the record medium.

Other objects and advantages of the invention will become apparent from the following detailed description of one example of how to practice the invention, and from the appended claims, when considered in connection with the accompanying drawing, consisting of a single figure which represents a longitudinal cross-sectional view substantially along the axis of a magnetic data storage disc embodying the principles of the invention.

Referring now to the figure, a magnetic data storage apparatus according to the invention comprises a disc member 10 made of non-magnetic material such as aluminum, magnesium, copper, plastic, and the like, with a magnetizable layer 12 disposed on a surface thereof. The disc member 10 is affixed to an extensible shaft assembly 14 for rotation thereby, and the extensible shaft assembly is, in turn, rotatably mounted in a housing 16 and is capable of being driven in any conventional manner such as by means of an electric motor 18.

The extensible shaft assembly 14 comprises a spindle member 20 and a trunnion member 22. The trunnion member 22, situated at the lower end, as seen in the figure, of the extensible shaft assembly 14, is rotatably mounted in the housing 16 by means of a bearing such as ball bearing 24. The spindle member 20 has a hollow cylindrical portion 26 substantially concentric to and surrounding the upper cylindrical end 28 of trunnion member 22. A slide ball bushing 30 is disposed in the annular space between the inner surface of the hollow cylindrical portion 26 of the spindle member and the outer surface of the cylindrical end 28 of the trunnion member to allow the spindle member 20 to be longitudinally displaceable in relation to the trunnion member 22. The spindle member and the trunnion member are caused to rotate in unison by means of a pin 32 diametrically disposed through both the spindle member and the trunnion member. The pin 32 has a tight fit in a diametrical bore 34 in the trunnion, and the corresponding diametrical bore 36 in the spindle member 20 is slightly elongated in a longitudinal direction to permit relative longitudinal motion of the spindle member in relation to the trunnion member. The spindle member 20 is rotatably mounted by means of the ball bearing 38 within an annular ring 40 which is in turn slidably mounted within the housing 16 by means of a slide ball bushing 42. The slide ball bushing 42 does not bear directly on the inner surface of the housing 16, but is supported by an annular member 44 provided with a spring retainer 46 containing a plurality of springs 48 pressing against an annular flange 50 integral with, or affixed to, the lower end of the annular ring 40. The springs 48 longitudinally bias the annular ring 40, thereby placing a pre-load upon the ball bearings 38 and 24. The annular ring 40 is prevented, by means not shown, from rotating in relation to the annular member 44, but is capable of longitudinal motion in relation thereof, and consequently the spindle member 20 is also longitudinally movable in relation to the housing 16. The spindle member 20 has, in its lower end, a conical flange portion 52 presenting a conical surface 54. The trunnion member 22 has also a conical flange portion 56 presenting a symmetrically inverted conical surface 58. A plurality of substantially heavy balls 60 is disposed between the conical surfaces 54 and 58.

Electromagnetic transducer heads 62 are disposed with a face 64 normally in close proximity to, but not touching, the magnetizable surface 12 on the disc member 10.

The transducer heads may be of the fixed type, that is they may be mounted fixedly in relation to the housing 16, or they may preferably be of the "flying" or fluid bearing type, that is they may be resiliently mounted in relation to the housing 16 and capable of being supported by the fluid bearing developed by the rotation of the disc member 10.

When the apparatus is at rest, the constitutive elements are in the position indicated in the figure. When the extensible shaft assembly is rotated, thereby rotating the disc member attached thereto, the spindle member 20 and the trunnion member 22 are rotated in unison, and the centrifugal force thus developed causes the balls 60 to be radially displaced outwardly, thereby longitudinally forcing apart the conical surfaces 54 and 58. The trunnion member 22 being compelled to remain in a longitudinally fixed position, the spindle member 20 is forced to be displaced in an upward direction, as seen in the drawing, displacing the disc member 10 to a position bringing the magnetizable record surface 12 in close proximity with face 64 of the electromagnetic transducer heads 62. The amount of displacement of the disc in the longitudinal direction may be determined by and is proportional to the angular velocity of rotation, but preferably the amount of longitudinal displacement may be predetermined by the amount of clearance separating the upper face of the annular flange 50 from the lower face of the annular member 44 when the apparatus is at rest.

When the disc member 10 ceases to rotate at a predetermined velocity, the balls 60 are caused to be radially displaced inwardly, under the influence of gravity and the biasing effect of the springs 48. The disc member 10 is longitudinally displaced in the direction which increases the distance seperating the magnetizable record surface 12 from the face 64 of the electromagnetic transducer heads 62. This automatic built-in "fail safe" mechanism prevents accidental damaging contact between the electromagnetic transducer heads and the record surface.

It is evident that, where it is required to operate a disc inverted, as compared to the herein illustrated example, or in the event that the disc is to be made in such a manner as to function in any position, such as would be the case for example in aircraft and spacecraft applications, substantially strong springs 48, or any other biasing means, may be used to urge the disc and longitudinally displace it to its normal position of rest affording a large clearance between the magnetizable surface and the transducer heads. The centrifugal force actuating mechanism of the invention will then operate in opposition to the action of the spring or biasing means. It is also evident that the present invention may also be used to longitudinally displace a frusto-conical data storage drum for the purpose indicated in the aforementioned U.S. patent application Serial Number 199,422.

It is to be understood that the above described arrangement is illustrative of only an example of the many applications and possible structural embodiments of the invention. Numerous other arrangements may be devised by those skilled in the art without departing from the spirit and scope of the invention.

What is claimed as new is:

1. A magnetic data storage apparatus comprising:
a stationary housing with a vertical axis;
radially fixed vertical shaft means rotatable relatively to said housing;
means driving said vertical shaft means;
a disc member disposed in said housing, said disc member having a magnetizable record surface on the upper face thereof;
means mounting said disc member in said housing for rotation by said shaft means and permitting limited longitudinal motion of said disc member relatively to said housing;
transducer means carried by said housing for scanning said magnetizable record surface;
and automatic means actuated by centrifugal force operatively connected to said disc member for elevating said disc member from a first position where the magnetizable surface on the upper face thereof is substantially spaced from said transducer means to a second position where the magnetizable record surface is in close proximity to said transducer means.

2. The apparatus of claim 1 wherein said transducer means are resiliently supported from said housing and are adapted to be dynamically supported by a viscous gas bearing developed by the rotation of said disc member.

3. The apparatus of claim 1 wherein said automatic means actuated by centrifugal force comprises said vertical shaft means including a spindle member and a trunnion member rotatable in unison and wherein:
said spindle member carries the disc member and is longitudinally displaceable relatively to the housing and to said trunnion member;
said trunnion member is longitudinally fixed relatively to the housing;
both said spindle and trunnion members are provided with symmetrically inverted conical surfaces;
a plurality of substantially heavy balls is disposed between said inverted conical surfaces;
whereby when the shaft means is rotated the balls are outwardly displaced by centrifugal force and cause the spindle member and consequently the disc member to be longitudinally and upwardly displaced by the camming action of said balls upon said conical surfaces.

4. The apparatus of claim 3 wherein abutment means are provided for limiting the longitudinal displacement of said spindle member.

5. A magnetic data storage apparatus comprising:
a housing;
a disc member in said housing, said disc member being rotatable relatively to said housing and capable of limited linear motion along an axis of rotation;
a recordable surface on one face of said disc member;
transducer means carried by said housing for scanning said recordable surface;
biasing means urging said disc member longitudinally to a first position where said recordable surface is substantially spaced from said transducer means;
and means responsive to centrifugal force operatively connected to said disc member to longitudinally displace said disc member against the action of said biasing means to a second position where the recordable surface is in close proximity to said transducer means.

6. The apparatus of claim 5 wherein said transducer means are resiliently supported from said housing and are adapted to be dynamically supported by a viscous gas bearing developed by the rotation of said disc member.

7. The apparatus of claim 1 wherein abutment means are provided for limiting the longitudinal displacement of said disc member.

8. Magnetic data storage apparatus comprising:
a recordable surface;
disc shaped support means for said surface;
means for rotating said support means;
bearing means for said support means permitting rotation around an axis and linear longitudinal displacement along said axis;
transducing means in spatial relationship with said recordable surface for recording thereon and for reading therefrom;
biasing means normally urging said support means to a longitudinal position of substantial clearance between said recordable surface and said transducing means;
and means actuated by centrifugal force for longitudinally displacing said support means in opposition to said biasing means.

9. The apparatus of claim 8 wherein abutment means are provided for limiting the longitudinal displacement of said support means.

References Cited by the Examiner

UNITED STATES PATENTS

| | | | |
|---|---|---|---|
| 2,915,358 | 12/59 | Richards | 340—174.1 |
| 3,030,452 | 4/62 | Uritis | 340—174.1 |
| 3,061,822 | 10/62 | Mitchell | 340—174.1 |
| 3,063,039 | 11/62 | Taft | 340—174.1 |
| 3,131,395 | 4/64 | Lekas | 340—174.1 |

IRVING L. SRAGOW, *Primary Examiner.*